United States Patent [19]

Doggett

[11] Patent Number: 4,598,398
[45] Date of Patent: Jul. 1, 1986

[54] TEST APPARATUS FOR PCM/FDM TRANSMULTIPLEXER

[75] Inventor: Eric L. Doggett, Raleigh, N.C.

[73] Assignee: ITT Corporation, New York, N.Y.

[21] Appl. No.: 623,853

[22] Filed: Jun. 22, 1984

[51] Int. Cl.[4] .......................... H04J 1/16; H04J 4/00; H04B 3/46; G01R 31/28
[52] U.S. Cl. ...................................... 370/17; 375/10; 371/27; 370/50
[58] Field of Search ............... 370/50, 70, 17; 375/10; 371/27; 364/721, 722

[56] References Cited

U.S. PATENT DOCUMENTS 4,451,918  5/1984  Gillette ................................. 371/27
4,486,876 12/1984  Gaunt, Jr. et al. ..................... 375/30
4,510,598  4/1985  Göckler et al. ........................ 370/50

Primary Examiner—Douglas W. Olms
Assistant Examiner—Frank M. Scutch, III
Attorney, Agent, or Firm—John T. O'Halloran; Jeffrey P. Morris

[57] ABSTRACT

A device is described which utilizes an addressing circuit to output, from a memory device, stored digital samples of an analog sinusoid, in logarithmic form, to a level control circuit, which modifies the digital level by means of adding a logarithmic scaler, and subsequently is encoded into a standard format, either linear, North American u-255 Law, or CCITT A-Law, and, after multiplexing with the respective bit rate. The addressing circuit has the capability to give an output with apparent frequencies in integer multiples of 8000/3989 Hz. Unused channels may be filled by a variety of digital signals, through use of a programmable memory device. Signalling control for the channels under interest is separate from the unused channels to aid in impulse noise testing. The signalling option can also be disabled.

A device which demultiplexes digital samples from a time division multiplex frame, encoded in linear, u-255 Law North American, or CCITT A-Law format, decodes the samples into 16 bit linear form via a memory device, and reconstructs the waveform into analog form via a digital to analog converter. The appropriate signalling information is also demultiplexed. Programmable gain is available digitally at the 16 bit linear decoding stage by utilizing a separate "page" of the memory device (up to 60.2 DB of gain).

22 Claims, 6 Drawing Figures

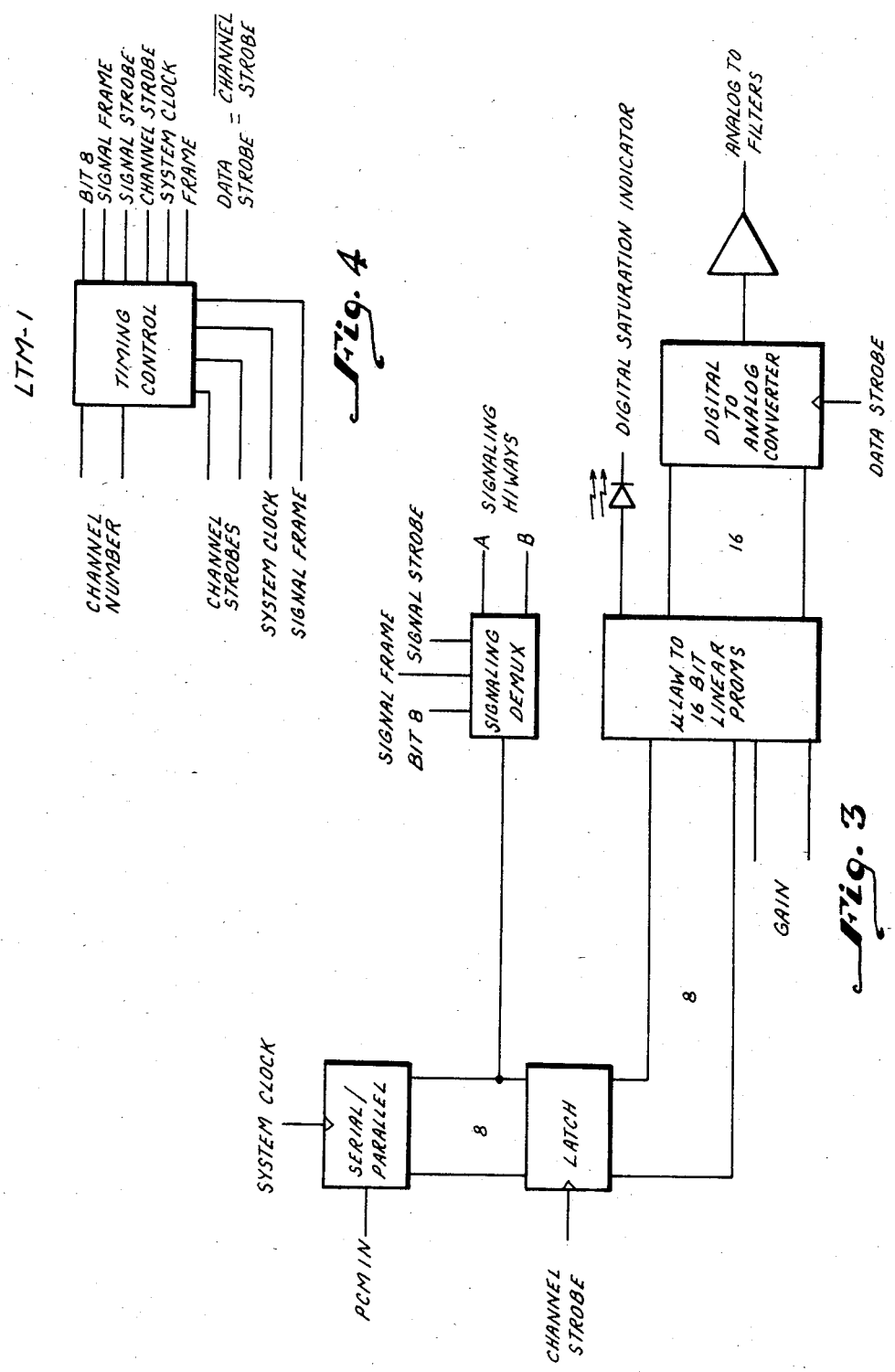

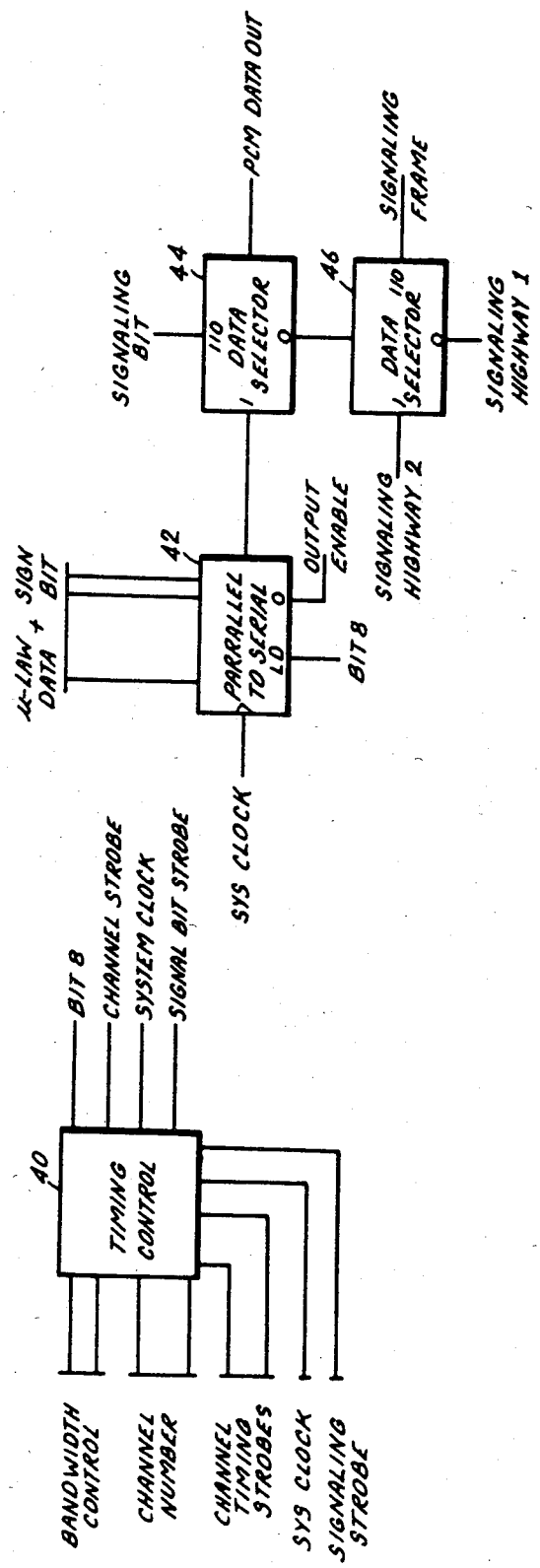

TEST APPARATUS FOR PCM/FDM TRANSMULTIPLEXER

BACKGROUND OF THE INVENTION

1. Field of the Invention

The present invention relates to improved test apparatus for pulse code modulation-to-frequency division multiplexed telecommunications transmultiplexer apparatus.

The present invention also relates to apparatus for testing expanded bandwidth program channels in PCM channel bank equipment on a single ended basis.

2. Description of the Prior Art

In the prior art, testing of transmultiplexer apparatus is accomplished by using an analog white noise generator together with banks of shaping filters consisting of high and low pass filters, a plurality of C-message weighting filters centered at a plurality of different frequencies, and channel bandpass and bandstop filters for each channel of interest, or an entire frequency division multiplex channel bank. The PCM testing is achieved with either a PCM test set or a PCM channel bank, and a channel at a time is tested.

It is desired to test PCM channels both with standard 8 KHz sampling rates as well as 16, 24, 32, and 48 KHz sampling rates utilizing standard u-255 law PCM coding and/or A-law PCM coding. It is further desired to obtain fine frequency resolution in the range of approximately 2 Hz.

PCM generator/receiver test sets of the prior art lack programmable sample frequencies. Additionally, prior art generator/receiver test sets of the prior art have used PCM simulation or decoding and testing telecommunication equipment having coarser frequency resolution and higher harmonic content that the test set of the present invention, without the capability of programmable selectivity in testing multiple channels simultaneously.

SUMMARY OF THE INVENTION

A device is described which utilizes an addressing circuit to output, from a memory device, stored digital samples of an analog sinusoid, in logarithmic form, to a level control circuit, which modifies the digital level by means of adding a logarithmic scaler, and subsequently is encoded into a standard format, either linear North American u-255 Law, or CCITT A-Law, and, after multiplexing with the appropriate signalling information, outputted serially at its respective bit rate. The addressing circuit has the capability to produce an output with apparent frequencies in integer multiples of 8000/3989 Hz. The addressing circuit has the capability for outputting the sinusoid samples in 1, 2, 3, 4, or 6 time slots per signalling frame to give apparent frequencies in integer multiples of (8000/3989) number time slots/frame. Unused channels may be filled by a variety of digital signals, through use of a programmable memory device. Signalling control for the channels under interest is separate from the unused channels to aid in impulse noise testing. The signalling option can also be disabled.

The PCM test apparatus of the subject invention can be applied at a standard T1 interface level to put a calibrated sine wave in any of 24 channels, with a frequency range of 2 to 4000 Hz. Additionally, phase incoherent noise can be outputted into all channels, all but the channel under test or none at all.

The noise weighting and characteristics can be changed with a prom change. The signalling highways of the channel under test can be separately controlled simultaneously with all the other channel highways which is advantageous for impulse noise testing.

Other advantages of the present invention include finer frequency resolution, and a programmable digital gain in an improved digital to analog converter.

Additionally, the foregoing apparatus is adapted in an embodiment of the invention to operate in a plurality of modes such that in a first mode a channel under test has applied to it a sinusoid signal while other channels are digitally quiet. In a second mode a channel under test has a sinusoid signal applied to it while other channels have noise applied thereto. In a third mode the channel under test is digitally quiet while the other channels are also digitally quiet. In a fourth mode the channel under test is digitally quiet while the other channels have noise applied thereto.

The sinusoid signal is of the same characteristics as described above. Approximately 4096 levels can be obtained at approximately 0.01 DB increments. The levels have been calculated to a thousandth of a DB accuracy.

The noise level consists of a series of harmonics of 31.25 HZ with random phase and of either flat, C-message, or psophometric weighting characteristics. In addition to the random phase of each harmonic in a channel, the phase relation between channels is also random. This satisfies CCITT recommendations for noise signals in telecommunications tests. This apparatus is particularly advantageous when testing a PCM/FDM transmultiplexer. The advantages are the reduced cost of implementing a test system, where high cost analog test equipment is not necessary due to the implementation of this invention. Another advantage is the ability to blank any channel of noise, not just a few channels, as is common practice due to the high cost of analog filters. The noise blanking characteristics are also much better done at the digital stage. The use of programmable digital gain at the demultipler greatly enhances both the noise immunity and the accuracy by operating at the optimum point of the level meter. System addressing circuitry is simplified by the use of either a programmable array logic or microcomputer device in the addressing circuit.

The receiver is a device which demultiplexes digital samples from a time division multiplex frame, encoded in linear, u-255 Law North American, or CCITT A-Law format, decodes the samples into 16 bit linear form via a memory device, and reconstructs the waveform into analog form via a digital to analog converter. The appropriate signalling information is also demultiplexed. Programmable gain is available digitally at the 16 bit linear decoding stage by utilizing a separate "page" of the memory device (up to 60.2 DB of gain). A programmable sampling frequency is obtained in the decoder by use of a phase-locked loop to strobe the analog output. The use of programmable digital gain at the demultiplexer greatly enhances both the noise immunity and the accuracy by operating at the optimum point of the level meter. System addressing circuitry is simplified by the use of either a programmable array logic or microcomputer device in the addressing circuit.

Additionally, advantages of the invention include finer frequency resolution, the ability to inject incoherent noise in every channel along with digital blanking rather than using conventional analog and noise filters, separate signalling control of the channel under test and all other channels for impulse noise tests, and a programmable digital gain in the digital to analog converter of, for example, 0-42 dB in 6 dB steps.

BRIEF DESCRIPTION OF THE DRAWINGS

FIG. 3 is a digital receiver kernal useful in connection with the present invention.

FIG. 4 is a timing control and signalling demultiplexer circit in accordance with the present invention.

FIG. 5 is a digital signal generator control and output circuit for altering the timing sequence of data.

DESCRIPTION OF THE PREFERRED EMBODIMENT

The transmultiplexer tester of the present invention enables a tester to control the data in all channels simultaneously, including signalling data. Data in T1 format at a 1.544 MHz clock rate consists of a plurality of frames of data. Each frame incudes 24 channels with each channel containing 8 bit data words plus an extra framing bit per frame for a total number of bits equal to 193 bits per frame. A u-Law to linear converter consisting of a set of PROMS is coupled to a gain control circuit which controls gain by addressing a different page of PROM gain from 0-60.2 dB in steps of 6.02 dB. A digital saturation indicator indicates when the signal is over-amplified.

DESCRIPTION OF THE PREFERRED EMBODIMENT

The basic system block diagram is an improvement over the Wandel and Golterman PCG signal generator series.

If one cycle of a sine wave is sampled N times, and the N samples outputted at a sampling frequency of SF, the resultant wave has an apparent frequency $f=SF/N$. If every X samples are skipped, the apparent frequency $F-XSF/N$.

If N is prime, all sample values will be uniquely outputted before the pattern repeats, thereby reducing harmonics.

To control the level, each sample is multiplied by a scaling factor. In actual practice, a full scale wave is stored in a logarithmic form (scaled to use all information bits) to control level, the log of an attenuation factor is aded in two's complement form, (subtracting) and the resultant is encoded into u-Law format via a PROM.

The system enables:
1. 1. Frequency resolution of 8000/3989 Hz vs. 8000/797 Hz for the prior art. A 12-bit address scheme is used to address 3989 sinusoid samples.
2. A log scaling scheme gives enhanced accuracy over the prior art.
3. Circuitry is provided to permit multiple sample outputs during a given "frame". In this way, expanded bandwidth program channel units can be correctly tested. The demultiplexer unit will also correctly decode the received data and output the analog equivalent. A frame consists of 24 (or 30) channels of data. Progrm channels utilize 2, 3, 4 or 6 channel time slots/frame. This unit is programmable to work in 1, 2, 3, 4 or 6 time slot modes.

Figure 1:
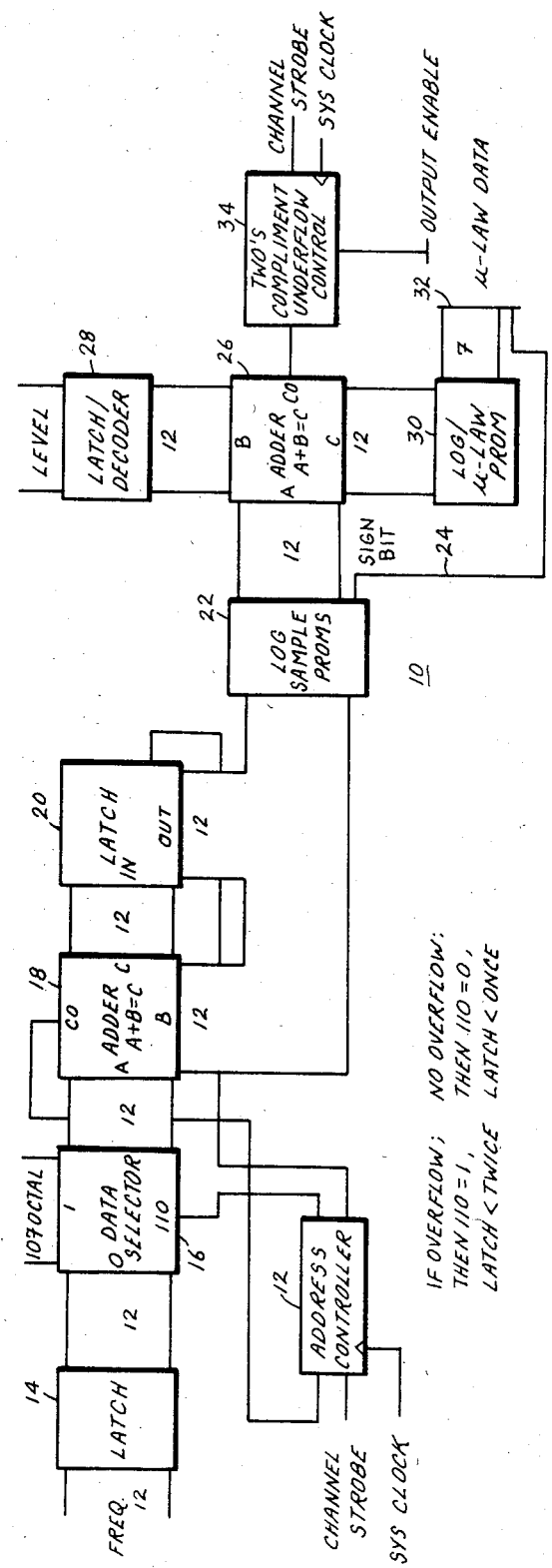
FIG. 1 is a digital sine wave generator kernal useful with the present invention.

Referring now to FIG. 1, a digital sine wave generator kernal is illustrated generally at 10. This unit receives input signals from an external controller with respect to frequency and signal level information. The unit 10 calculates an output of parallel PCM data in standard T1 format and couples the output T1 data to the receiver unit described with reference to FIG. 3. A system clock, typically 1.544 $MH_z$ extracted from the T1 interface of the channel unit or channe bank under test, is coupled to an address controller 12. The address stage consists of an input data latch 14, a data selector circuit 16, an adder circuit 18 for implementing the addition $A+B=C$, an address latch 20 and the address controller 12.

Frequency information in 12-bit linear format at a frequency code N−freq. 3989/sampling freq. is latched in by the input latch 14. This data is then normally coupled through the data selector 16 to the adder stage 18, with the output of the adder stage 18 being latched back into the other adder 18 input. In this manner, the frequency information, representative of the number of address skips, is added to itself repeatedly, thereby generating a series of addresses from 107 to 4096. The process is sequenced and timed by the address controller 12. The address controller 12 has a channel strobe input, which is an 8-bit wide signal which is true during the time slot assigned to the desired channel. The other input to address controller 12 is the system clock. When the adders overflow, the address controller 12 switches the data selectors 16 to add in a preset to the remainder, and strobes the address latch 20 twice generating another valid address. This process is called "wraparound".

The log sample PROMS 22 contain a 12-bit scaled logarithmic code which represents samples of one cycle of a sine wave. There are 3989 samples of the sine wave and a separate sine bit output on line 24 for each sample. The sampling is skewed off slightly to avoid singularities at the zero crossings. The output of log sample PROMS 22 is coupled to another adder stage 26, which scales the digital signal to the desired level. The stored wave is scaled to be full scale so the levels are attenuated at this stage. This is done by adding the two's complement of a 12-bit attenuation code determined by computer simulation. Using two's complement addition, which is effectively subtraction the adder stage 26 should always overflow signalling a valid operation. The level output is coupled to latch decoder 28 from which it is coupled to the adder 26. The level input is the two's complement of the logarithmic attenuation code as defined in the look-up tables. Near zero crossing and with high levels of attenuation, the addition will underflow, indicating that the PCM zero code should be outputted (the lowest level) with an invalid resultant code, and the output stage is strobed to give an all 1's output for that sample. The resultant logarithmic code is then encoded at a log/u-Law PROM 30 into the standard u-Law format, or alternatively A-Law, by changing PROM 30, so that u-Law data is outputted together with a sine bit at lines 32. The two's complement underflow control 34 which is clocked by the system clock and strobed by the channel strobe generates an output enable signal on line 36 which signals when the two's complement arithmetic overflows which would tell any later stage to which it is coupled to output all 1's (digital quiet). The u-Law data coupled out on lines 32 consists of standard 7-bit companded code plus the polarity bit.

Figure 2:
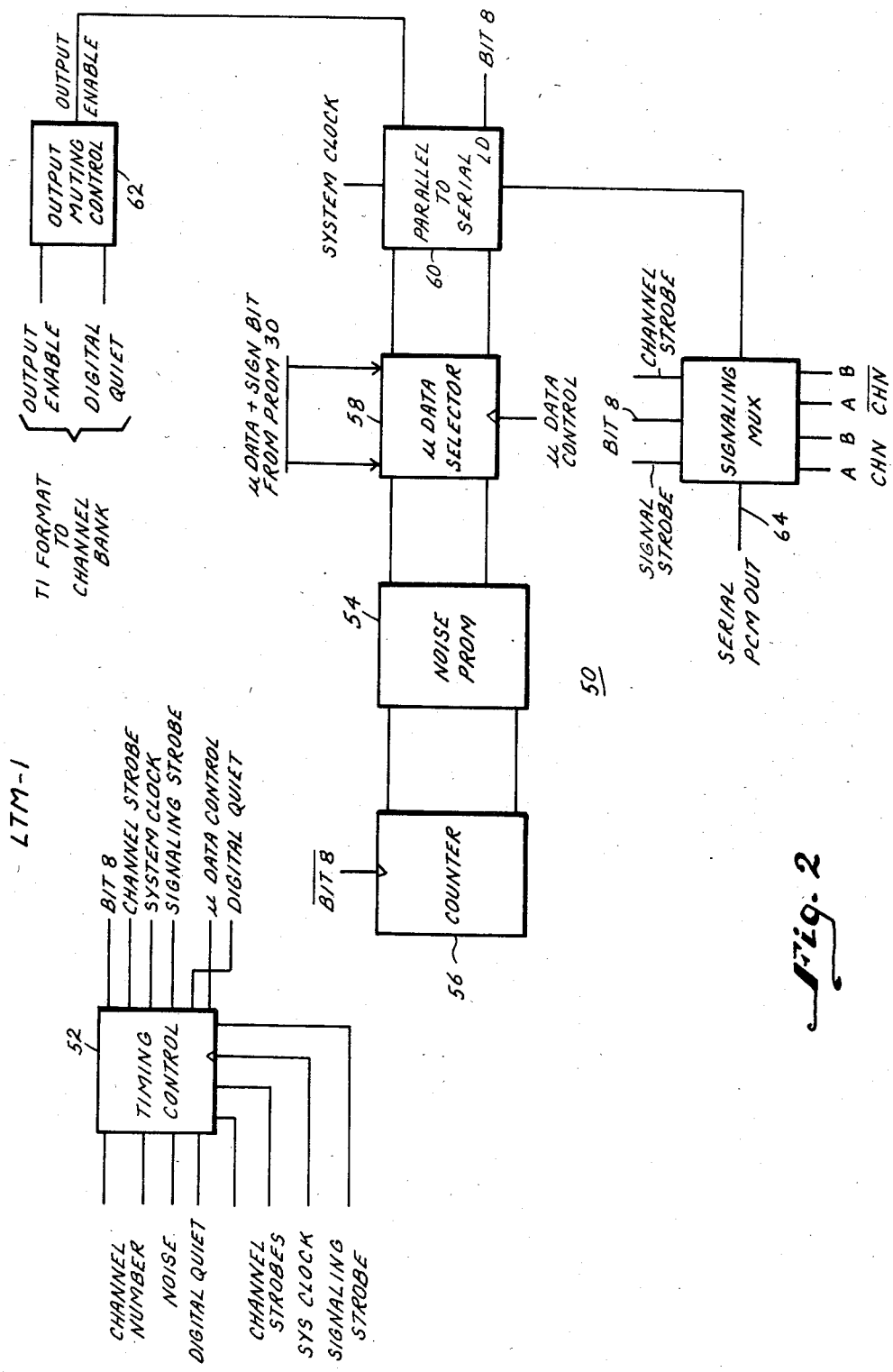
FIG. 2 is a timing and control circuit for multiplexing digital noise information.

Referring now to FIG. 2, the timing and control circuitry for multiplexing digital noise information, noise generation and signalling are illustrated generally at 50. The test signal path of all 24 channels under test can be loaded with noise. The control signalling highways can be tested simultaneously. Noise can be inserted into a plurality of channels simultaneously. Thus, tests of whole channel banks or selected channels can be run with loaded noise, with bank noise, or with standard transmission tests. The testing of multiple channels simultaneously results in significant cost reduction in testing apparatus.

The timing control circuit 52 produces the same output signals as the program channel unit would if set on one time slot/frame, an 8-KHz sampling rate. A noise PROM 54 is addressed by other circuitry with any desired address. Noise PROM 54 contains 6144 samples for the 24 channels, or 256 samples per channel. This is a weighted harmonic series of phase incoherent sinusoids spaced at 31.25 Hz (in accordance with CCITT standards). This noise data is multiplexed into the parallel data path, and then converted to serial along with the u-Law data. The signalling information of both the channel under test and the other channels is multiplexed into the serial data stream. The output enable strobes the parallel to serial converter to disable it for the one time slot whenever the underflow condition occurs or the digital quiet option is used. The illustrated control lines give one the ability to output the following:

| CHANNEL UNDER TEST | OTHER CHANNELS |
|---|---|
| 1. sine wave | digital quiet |
| 2. sine wave | phase incoherent noise |
| 3. digital quiet | phase incoherent noise |
| 4. digital quiet | digital quiet |
| 5. phase incoherent noise | phase incoherent noise |

The complement of bit-8 cycles counter 56 to time noise PROM 54. The noise is inserted into the u-Law data at selector 58. Parallel to serial converter 60 converts the output of u-Law data selector 58 to serial data. An output muting control circuit 62 is enabled by the output of parallel to serial converter 60 and selectively transmits either output enable or digital quiet signals in T1 format to the channel bank under test.

The data output of parallel to serial counter 60 is coupled to the signalling multiplexer 62 and is coupled out on line 64. Signalling on highways A and B is coupled to selected channels CHN on to all other channels, CHN.

FIG. 3, a digital receiver kernal for receiving digital data on line 102 in T1 format is illustrated generally at 100. Recover 100 outputs an audio frequency output on line 104, and signalling information on signalling highways A and B on lines 106 and 108 respectively. The serial PCM data stream on line 102 is converted to a parallel 8-bit format at serial to parallel converter 110, and is then latched in at latch 112. The 8-bit data is then converted to 16-bit linear data by a u-Law to 16-bit linear PROM 114, with the desired digital gain, in steps of 6.02dB. The output of the u-Law to linear PROM 114 is then converted to analog at digital-to-analog converter 116. Signalling information is demultiplexed from the data by a signalling demultiplexer circuit 118, and is coupled out on signalling highways A and B.

Referring now to FIG. 4, timing control for the receiver of FIG. 3 is illustrated. Timing control circuit 70 has input thereto the channel number, channel strobes, system clock and signal frame. The circuit outputs bit-8, signalling frame, signalling strobe, clock, frame and data strobe.

Referring now to FIG. 5, the digital signal gnerator control and output circuitry is illustrated. This circuit alters the timing sequence of the data. The timing generator control 40 functions to strobe the digital sine wave generator 10 to start the calculations. Timing control 40 has bandwidth control, channel number, channel timing strobes, the system clock and a signalling strobe coupled thereto. It outputs bit-8, the channel strobe, the system clock and a signalling bit strobe. The following is applicable:

Bandwidth Control=1, channel strobes
Channel Number=N during channel N
Bandwidth Control=2 channel strobes during channel N and N+12 (wraparound 24)
Bandwidth Control=3 during channel N and N+8, N+16
Bandwidth Control=4 during channel N and N+6, N+12, N+18
Bandwidth Control=6 during channel N and N+4, N+8, N+12, N+16, N+20

The timing strobes are processed by the timing control 40 to give the appropriate number of strobes per frame which corresponds to the desired bandwidth. Parallel to serial converter 42 converts the u-Law data to serial data and then the data selectors 44 and 46 multiplex the PCM data and signalling information out, with the signalling information also being multiplexed into the data stream.

Figure 6:
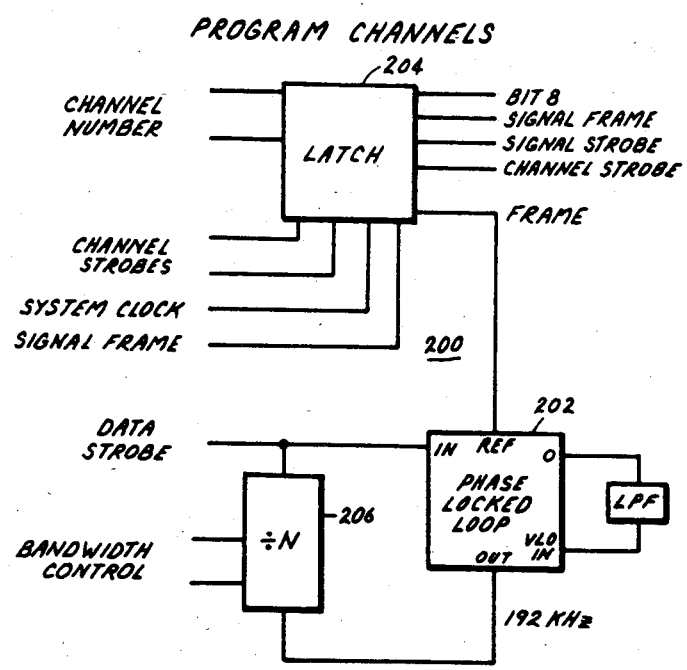
FIG. 6 is a digital receiver controller for controlling the timing and channel selection and for providing the bandwidth control for the digital receiver kernal of FIG. 3.

Referring now to FIG. 6, the digital receiver controller is illustrated generally at 200, this circuit 200 controls the timing and channel selection and bandwidth control for the digital receiver described with reference to FIG. 3. The program channel receiver includes a phase locked loop 202 which locks to the 8 KHz frame and strobes the digital to analog converter 116 to output the samples evenly in time. The addition of the frame bit skews the digital samples slightly in time. The output of latch 204 includes bit-8, the signal frame data, the signal strobe and the channel strobe and the frame to PLL 202. A divide by N circuit 206 receives the bandwidth control information and is driven by the 192 KHz output of PLL 202.

While the present invention has been described in connection with a preferred embodiment thereof, it is to be understood that additional embodiments, modifications and applications which will become obvious to those skilled in the art are included within the spirit and scope of the invention as set forth by the claims appended thereto.

I claim:
1. Test apparatus for selectively and programmably testing equipment housing a plurality of channels of transmultiplexer apparatus simultaneously, comprising:
  means for generating a sinusoidal waveform;
  means for logarithmally representing said waveform and adding a logarithmic attenuation factor thereto for level control, means for storing digital samples of said representation of said sinusoidal waveform means for encoding said digital samples into a desired code format and multiplexing with signalling data;

means for programmably and selectively addressing said storage means for causing said stored digital samples to be outputted in a plurality of channels per frame, whereby equipment may be tested with improved frequency resolution and enhanced accuracy.

2. Test apparatus in accordance with claim 1 wherein said desired code format is u-Law.

3. Test apparatus in accordance with claim 1 wherein said desired code format is A-Law.

4. Test apparatus in accordance with claim 1 wherein unused channels are filed with phase incoherent noise.

5. Test apparatus in accordance with claim 4 wherein said noise means includes a PROM.

6. Test apparatus in accordance with claim 5 wherein said PROM includes noise weighting and digital gain control information stored therein.

7. Test apparatus in accordance with claim 1 further including a digital receiver means for receiving serial digital data and outputting an analog audio frequency signal having signalling information demultiplexed therein.

8. Apparatus in accordance with claim 1 further including:
a PROM for storing a plurality of samples for a plurality of channels, said samples comprising a weighted harmonic series of phase incoherent sinusoids.

9. Apparatus in accordance with claim 8 wherein said stored samples in said PROM consist of noise data.

10. Apparatus in connection with claim 9 further including:
means for multiplexing said noise data into a parallel data path; and
means for converting said noise data and said parallel data to serial data.

11. Apparatus in accordance with claim 10 wherein said parallel data is u-Law data.

12. Apparatus in accordance with claim 10 wherein said parallel data is A-Law data.

13. Test apparatus in accordance with claim 1 adapted for multimode operation wherein a channel under test selectively has either a sinusoidal signal applied to it or is digitally quiet, or has noise applied thereto.

14. Test apparatus in accordance with claim 7 further including means for converting incoming serial data to parallel data and means for decoding from A-Law into 16 bit linear.

15. Test apparatus in accordance with claim 7 further including means for converting incoming serial data to parallel data and means for decoding from u-Law into 16 bit linear.

16. Test apparatus in accordance with claim 14 wherein said conversion is accomplished in a PROM translator means.

17. Test apparatus in accordance with claim 15 wherein said conversion is accomplished in a PROM translator means.

18. Test apparatus in accordance with claim 16 wherein said PROM translator contains memory mapped incremental gain.

19. Test apparatus in accordance with claim 17 wherein said PROM translator contains memory mapped incremental gain.

20. Test apparatus in accordance with claim 1 wherein said samples are inserted in a plurality of time slots per signalling frame.

21. Test apparatus in accordance with claim 7, wherein a programmable sampling frequency is obtained by phase lock loop means.

22. Test apparatus in accordance with claim 1 further including:
means for deriving a digitally programmable incremental gain for said samples.

* * * * *